United States Patent
Hsieh et al.

(10) Patent No.: US 11,553,710 B2
(45) Date of Patent: Jan. 17, 2023

(54) ANTIBACTERIAL AND DEODORIZING LEATHER

(71) Applicant: FU HSING LEATHER CO., LTD., Kaohsiung (TW)

(72) Inventors: Andy Hsieh, Kaohsiung (TW); Jason Hsieh, Kaohsiung (TW)

(73) Assignee: Fu Hsing Leather Co., Ltd., Kaohsiung (TW)

(*) Notice: Subject to any disclaimer, the term of this patent is extended or adjusted under 35 U.S.C. 154(b) by 60 days.

(21) Appl. No.: 16/986,627

(22) Filed: Aug. 6, 2020

(65) Prior Publication Data

US 2021/0386058 A1 Dec. 16, 2021

(30) Foreign Application Priority Data

Jun. 16, 2020 (TW) ................. 109207563

(51) Int. Cl.
  *A01N 25/08* (2006.01)
  *A41D 31/30* (2019.01)
  *A43B 1/00* (2006.01)

(52) U.S. Cl.
  CPC ............ *A01N 25/08* (2013.01); *A41D 31/305* (2019.02); *A43B 1/0045* (2013.01)

(58) Field of Classification Search
  CPC ..... A01N 25/08; A41D 31/305; A43B 1/0045
  See application file for complete search history.

(56) References Cited

U.S. PATENT DOCUMENTS 3,269,859 A * 8/1966 Lowell ............... C14C 9/00
427/445

FOREIGN PATENT DOCUMENTS

| CN | 202072964 U | * | 12/2011 |
| CN | 202643710 U | * | 1/2013 |
| CN | 108265523 A | * | 7/2018 |
| JP | 1994017378 A | * | 1/1994 |

* cited by examiner

*Primary Examiner* — Ali Soroush
(74) *Attorney, Agent, or Firm* — Rosenberg, Klein & Lee

(57) ABSTRACT

An antibacterial and deodorizing leather includes a leather body and an antibacterial and deodorizing layer. The antibacterial and deodorizing layer includes a water-based foaming material and an antibacterial deodorant. The water-based foaming material and the antibacterial deodorant are mixed and arranged on the leather body and then bonded with the leather body by hot pressing. By uniformly mixing the antibacterial deodorant and a bactericide through the water-based foaming material to become gelatinous, the antibacterial and deodorizing layer is arranged on the leather body according to the size of the leather body. Then, the antibacterial and deodorizing layer is tightly bonded with the leather body by hot pressing, achieving the effects of saving costs, simplifying the manufacturing process, and environmental protection.

3 Claims, 6 Drawing Sheets

ANTIBACTERIAL AND DEODORIZING LEATHER

FIELD OF THE INVENTION

The present invention relates to leather, and more particularly to antibacterial and deodorizing leather.

BACKGROUND OF THE INVENTION

Because of the breathability, durability and special grain of a genuine leather material, genuine leather products occupy a certain rate in the market. On the contrary, based on the consideration of animal protection and price, artificial leather is developed accordingly. In order to achieve an antibacterial and deodorizing effect of leather products, an antibacterial agent is added to achieve the antibacterial effect in the leather production process. In general, the antibacterial agent is added to a solid foaming material, and then the solid foaming material is attached to the leather by means of solid viscose. However, the leather produced by this method is not only troublesome but also easy to waste materials and increase costs if the size is different in the lamination process. In addition, the solid foaming material and solid viscose need special treatment after recycling so as not to harm the environment. This is not eco-friendly.

SUMMARY OF THE INVENTION

In order to save the manufacturing cost and simplify the manufacturing process, the primary object of the present invention is to provide an antibacterial and deodorizing leather.

The antibacterial and deodorizing leather comprises a leather body and an antibacterial and deodorizing layer. The antibacterial and deodorizing layer includes a water-based foaming material and an antibacterial deodorant. The water-based foaming material and the antibacterial deodorant are mixed and arranged on the leather body and then bonded with the leather body by hot pressing.

Preferably, the leather body includes a skin layer and a fibrous layer. The skin layer includes a skin connecting surface. The fibrous layer includes a fibrous connecting surface and a fibrous surface. The fibrous connecting surface and the fibrous surface are located on two opposite surfaces of the fibrous layer. The skin connecting surface is bonded with the fibrous connecting surface. The antibacterial and deodorizing layer is bonded with the fibrous surface.

Preferably, the water-based foaming material accounts for 5-10 parts by weight, and the antibacterial deodorant accounts for 6-10 parts by weight.

Preferably, the antibacterial and deodorizing layer further includes a bactericide, and the bactericide accounts for 8-10 parts by weight.

The above technical features have the following advantages:

1. By uniformly mixing the antibacterial deodorant and the bactericide through the water-based foaming material to form the gelatinous mixture, the antibacterial and deodorizing layer is arranged on the leather body according to the size of the leather body. Then, the antibacterial and deodorizing layer is tightly bonded with the leather body by hot pressing, achieving the effects of saving costs, simplifying the manufacturing process, and environmental protection.

2. The antibacterial and deodorizing layer is arranged on the fibrous layer to be in direct contact with the human body, so that the antibacterial and deodorizing effects are better.

BRIEF DESCRIPTION OF THE DRAWINGS

FIGS. 5-7 are excerpts from a certification report directed to the properties of the embodiment.

DETAILED DESCRIPTION OF THE PREFERRED EMBODIMENTS

Embodiments of the present invention will now be described, by way of example only, with reference to the accompanying drawings.

Figure 1:
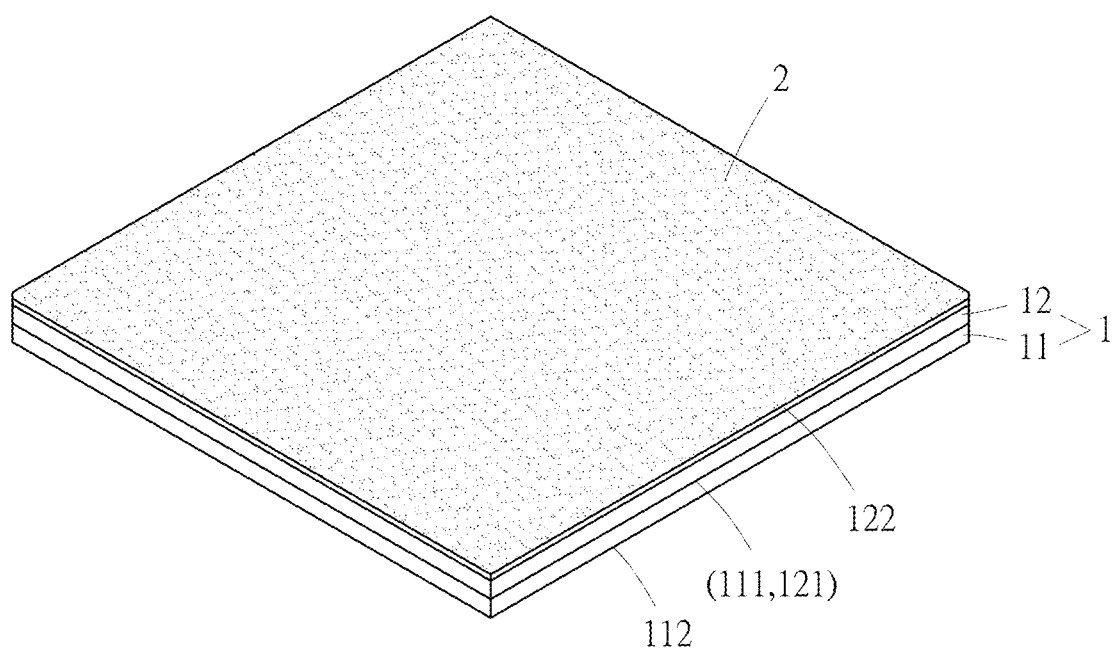
FIG. 1 is a perspective view of the antibacterial and deodorizing leather according to an embodiment of the present invention.
Figure 2:
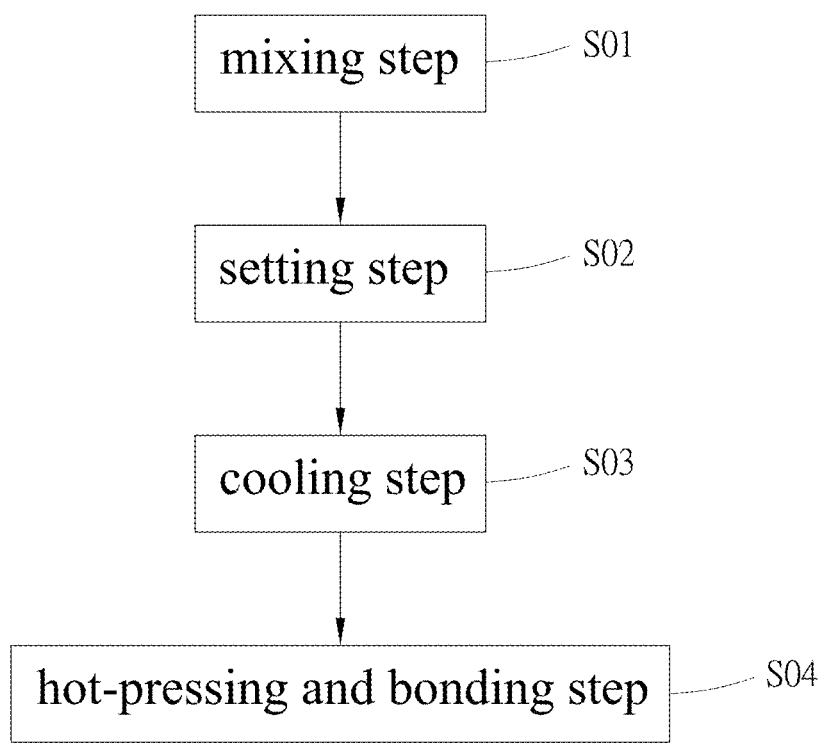
FIG. 2 is a flowchart illustrating the manufacturing process of the embodiment.

FIG. 1 and FIG. 2 illustrate an embodiment of the antibacterial and deodorizing leather of the present invention. The antibacterial and deodorizing leather comprises a leather body 1 and an antibacterial and deodorizing layer 2.

The leather body 1 includes a skin layer 11 and a fibrous layer 12. The skin layer 11 includes a skin connecting surface 111 and a skin surface 112. The skin connecting surface 111 and the skin surface 112 are located on two opposite surfaces of the skin layer 11. The fibrous layer 12 is a split leather layer and includes a fibrous connecting surface 121 and a fibrous surface 122. The fibrous connecting surface 121 and the fibrous surface 122 are located on two opposite surfaces of the fibrous layer 12. When the skin connecting surface 111 is bonded with the fibrous connecting surface 121, the skin layer 11 and the fibrous layer 12 are stacked and bonded. The skin surface 112 is the grained bright surface of the leather body 1. In a leather product, such as leather shoes, leather sofas, leather bags, etc., the skin surface 112 is exposed to show the bright grain of the leather product. The fibrous surface 122 is the rough surface of the leather body 1.

The antibacterial and deodorizing layer 2 includes a water-based foaming material, an antibacterial deodorant, and a bactericide.

The water-based foaming material is gelatinous, has good bending resistance and good filling effect, and will not glue together when ironing or stacking. The antibacterial deodorant has mildew-proof and antibacterial effects. The bactericide has the effect of killing bacteria harmful to a human body 10 (referring to FIG. 3), such as *Escherichia coli* and *Staphylococcus*, and so on. The water-based foaming material accounts for 5-10 parts by weight, the antibacterial deodorant accounts for 6-10 parts by weight, and the bactericide accounts for 8-10 parts by weight. The water-based foaming material includes a foaming agent and water by a weight ratio of three to two.

A method of manufacturing the antibacterial and deodorizing leather includes a mixing step S01, a setting step S02, a cooling step S03, and a hot-pressing and bonding step S04.

Mixing step S01: mixing the water-based foaming material, the antibacterial deodorant and the bactericide uniformly to form a gelatinous mixture.

Setting step S02: coating the mixture on the fibrous surface 122 of the fibrous layer 12.

Cooling step S03: drying the mixture arranged on the fibrous surface 122 and standing for cooling. After drying, the mixture is allowed to stand for about 10 minutes, the mixture is cooled to a temperature below 30 degrees, and the mixture becomes a solid state.

Hot-pressing and bonding step S04: pressing the gelatinous mixture to form the antibacterial and deodorizing layer 2 by means of a hot pressing machine or a roller coating machine and bonding the antibacterial and deodorizing layer 2 and the leather body 1 together.

In the present invention, because the water-based foaming material is an excellent bonding interface, the antibacterial deodorant and the bactericide can be uniformly mixed to form the mixture. The mixture is gelatinous and can be arranged on the fibrous surface 122 according to the size of the leather body 1. Then, the antibacterial and deodorizing layer 2 is tightly bonded with the leather body 1 by hot pressing. Therefore, the present invention solves the problems in the conventional leather production process, that is, in the process of laminating foam materials, it may cause material waste and increase costs due to errors in cutting and laminating. In addition, the antibacterial and deodorizing layer 2 is integrated with the leather body 1. There is no need to recycle the antibacterial and deodorizing layer 2, achieving the effects of saving materials and costs, simplifying the manufacturing process, and environmental protection.

Figure 3:
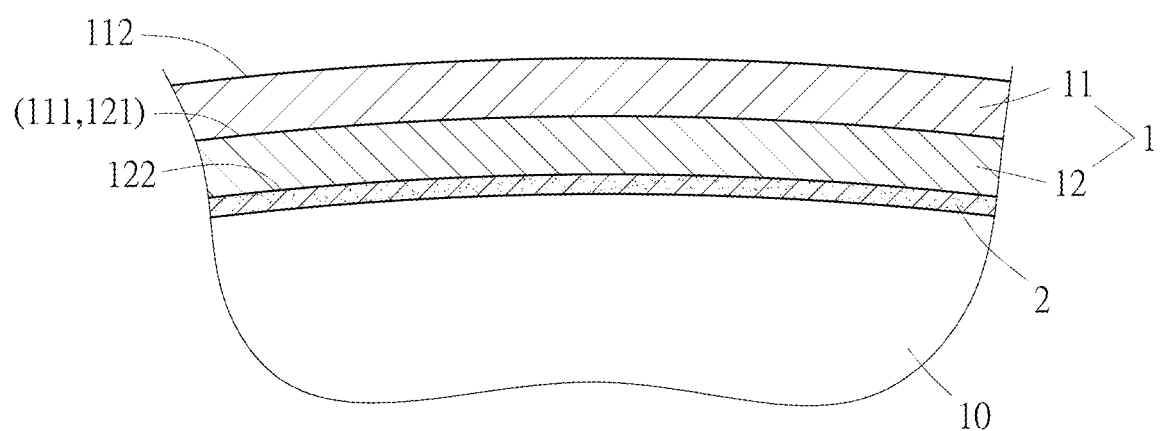
FIG. 3 is a schematic view illustrating that the antibacterial and deodorizing leather is in contact with a human body.
Figure 4:
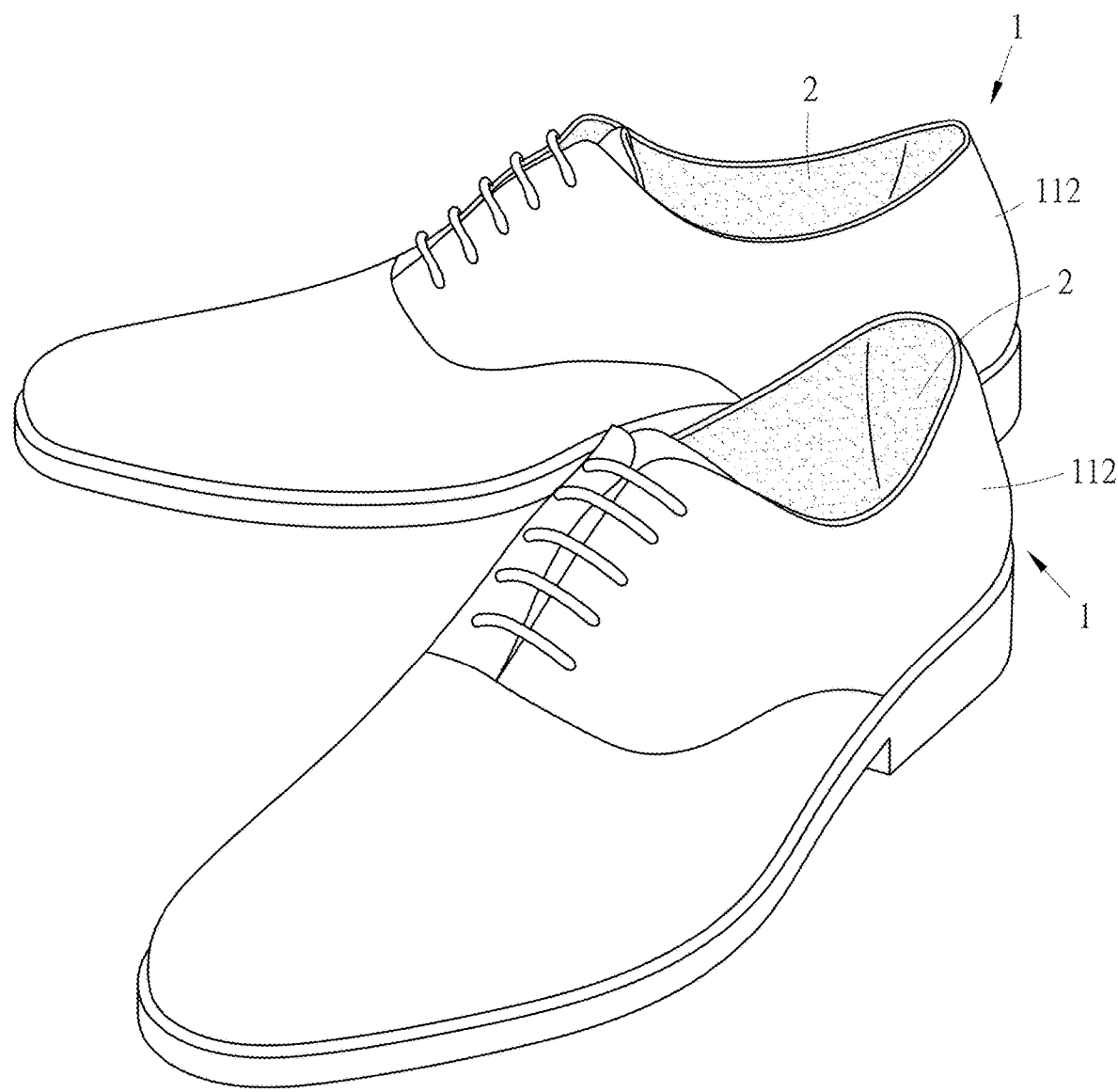
FIG. 4 is a perspective view illustrating a pair of leather shoes made of the antibacterial and deodorizing leather.
Figures 5, 6:
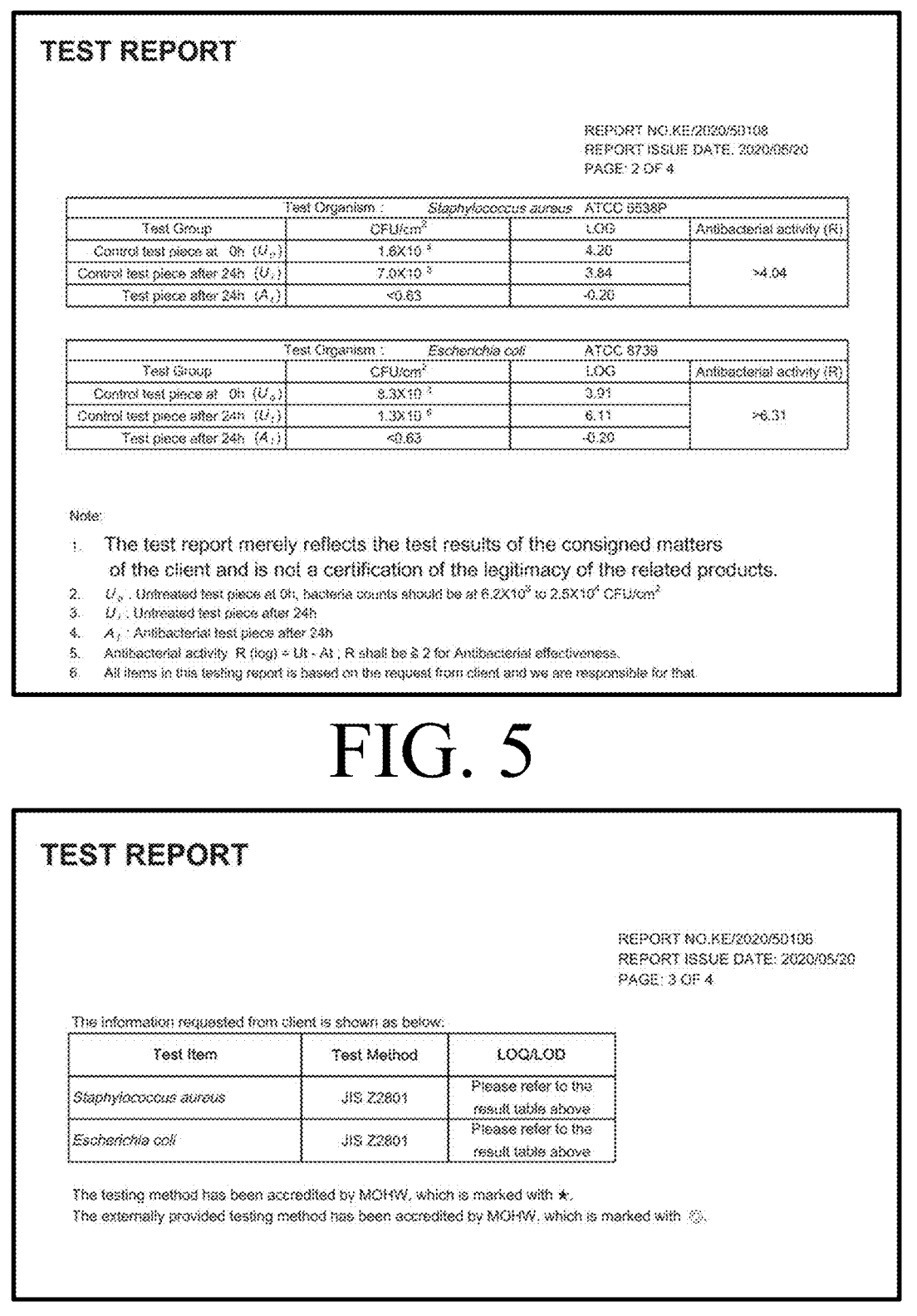
Figure 7:

Referring to FIG. 3 and FIG. 4, the antibacterial and deodorizing leather can be used for making leather products, such as leather shoes, leather clothes, leather gloves, etc. In this embodiment, leather shoes are taken as an example. In general, the fibrous surface 122 of the antibacterial and deodorizing leather comes into contact with the human body 10. By providing the antibacterial and deodorizing layer 2 on the fibrous surface 122 and allowing the antibacterial and deodorizing layer 2 to directly contact the human body 10, the fibrous surface 122 can achieve antibacterial, deodorizing and mildew proof effects. The antibacterial and deodorizing leather provided by the present invention was sent to SGS (an independent laboratory) for certification. As shown in FIGS. 5-7, the SGS certification report, the antibacterial activity parameter (R) of the antibacterial and deodorizing leather is much greater than 2, so the antibacterial effect of the antibacterial and deodorizing leather meets the standard.

In summary, by uniformly mixing the antibacterial deodorant and the bactericide through the water-based foaming material to form a gelatinous mixture, the antibacterial and deodorizing layer 2 is arranged on the leather body 1 according to the size of the leather body 1, and then the antibacterial and deodorizing layer 2 is tightly bonded with the leather body 1 by hot pressing, achieving the effects of saving costs, simplifying the manufacturing process, and environmental protection. In addition, the antibacterial and deodorizing layer 2 is arranged on the fibrous layer 12 to be in direct contact with the human body 10, such that the antibacterial and deodorizing effects are better.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An antibacterial and deodorizing leather, comprising:
    a leather body formed of genuine leather and having predetermined dimensions, wherein the leather body includes a skin layer and a split leather layer, the skin layer including a skin connecting surface and the split leather layer including a fibrous connecting surface and a fibrous surface, wherein the fibrous connecting surface and the fibrous surface are located at two opposite surfaces of the split leather layer, and wherein the skin connecting surface is bonded with the fibrous connecting surface, and
    an antibacterial and deodorizing layer applied to said leather body, said antibacterial and deodorizing layer including a gelatinous mixture of a water-based foaming material with an antibacterial deodorant and a bactericide, the gelatinous mixture of the water-based foaming material, the antibacterial deodorant and the bactericide being applied to the fibrous surface of said split leather layer of the leather body in correspondence with said predetermined dimensions of said leather body and bonded with the fibrous surface of the leather body by hot pressing.

2. The antibacterial and deodorizing leather as claimed in claim 1, wherein the water-based foaming material accounts for 5-10 parts by weight, and the antibacterial deodorant accounts for 6-10 parts by weight.

3. The antibacterial and deodorizing leather as claimed in claim 1, wherein the bactericide accounts for 8-10 parts by weight.

* * * * *